Figures 1, 2:
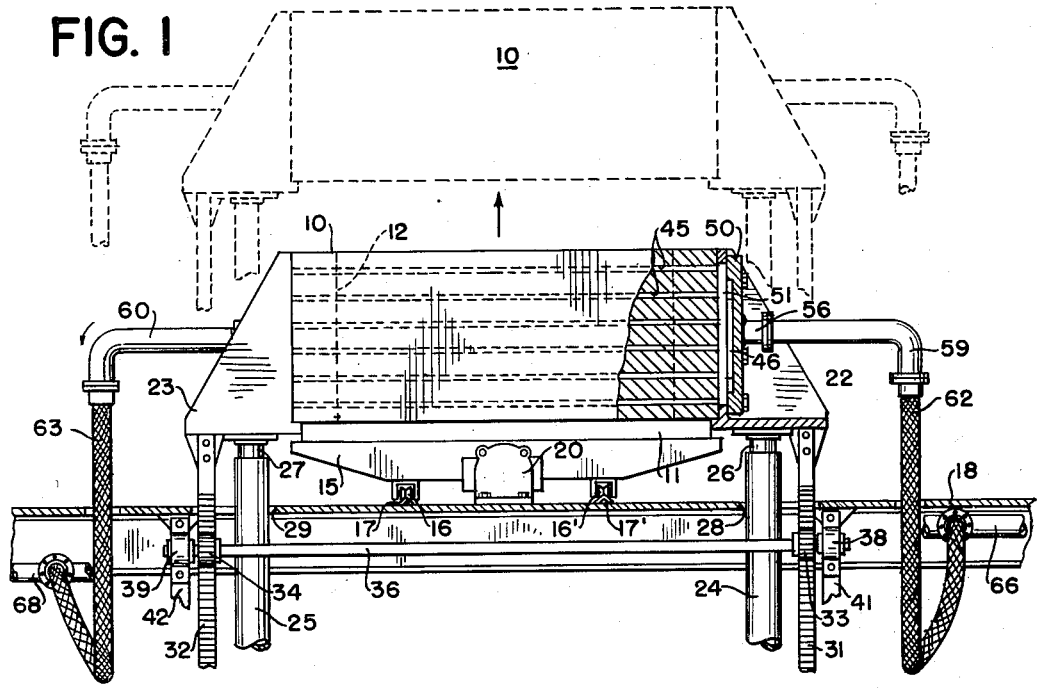

July 25, 1961     D. C. ROWELL     2,993,248

APPARATUS FOR CASTING COPPER CAKES

Filed Feb. 16, 1959

INVENTOR
DOUGLAS C. ROWELL

BY

ATTORNEYS

United States Patent Office 2,993,248
Patented July 25, 1961

1

2,993,248
APPARATUS FOR CASTING COPPER CAKES
Douglas C. Rowell, Kenosha, Wis., assignor to The Anaconda American Brass Company, a corporation of Connecticut
Filed Feb. 16, 1959, Ser. No. 793,582
5 Claims. (Cl. 22—61)

This invention relates to the casting of rectangular cakes of copper and other metals; and more particularly, to apparatus for side-pouring such cakes in a water-cooled vertical mold wherein the open end of the mold cavity defines one of the narrow longitudinal sides of the finished cake. The apparatus of the invention is further characterized by an improved means for removing the cast cake by raising the mold from the finished cake while the cake itself rests on a mold base, and then moving the mold base laterally to a position in which the cake is clear of the mold.

In the casting of copper and copper alloy cakes which are designed to be rolled into sheet or strip, it is common for the mold cavity to be vertical so that the open upper end of the cavity defines the end of the cake. Thus the area of the cake which is exposed to the atmosphere during solidification of the molten copper is minimized. This end of the cake can be and often is cut from the cake prior to rolling, to remove the surface defects which form there as a result of its being uppermost and exposed to the atmosphere during casting. It has also been proposed heretofore to cast copper cakes with a side edge uppermost, and to cut such side edge from the cake prior to casting or to shear it from bars rolled from the cake to remove casting surface defects.

Apparatus heretofore developed for casting end-poured copper cakes have required considerable handling and moving of the newly cast cake to remove it from the mold. Generally, the cake is dropped or lowered from the mold cavity while the block remains fixed, and then it has to be tipped on its side for further handling. These operations sometimes result in damaging the cast cake to such an extent that substantial work must be done on it to chip out or cut off the damaged sections, and of course considerable scrap is made in the process of doing so.

It is the purpose of the present invention to overcome these and other shortcomings of heretofore known cake casting methods and apparatus. The invention contemplates casting cakes on their sides, so that the "set" surface exposed to the atmosphere during casting extends along one longitudinal edge of the cake. The mold block is arranged to be lifted from the cake after it has solidified, and it incorporates an improved cooling system which permits lifting the mold without interrupting the continuous circulation of cooling fluid.

The new apparatus comprises a vertically movable block having a mold cavity extending vertically therethrough, and a base member adapted to underlie the mold block in contact therewith to close the bottom of the mold cavity. The cavity is of uniform substantially rectangular horizontal cross section and has a depth greater than the width and less than the length of its cross section. Lifting means are provided for raising the mold block from the base member a distance at least as great as the working depth of the cavity, whereby a cake cast in the mold cavity may be released therefrom by raising the mold block from the cake. The base member is mounted for movement horizontally, and traversing means are provided for moving the base member laterally from its position underlying the block to a position a substantial distance laterally therefrom where the cake is clear from the mold and in a position where it can easily be handled with a minimum risk of being damaged.

A preferred embodiment of the invention is described below with reference to the accompanying drawing, wherein:

FIG. 1 is an elevation partially in section of the new casting apparatus showing two positions of the mold block; and FIG. 2 is a plan view of the new apparatus showing two positions of the base member.

Referring to both FIGS. 1 and 2, a mold block 10 is shown in solid lines supported on a flat base member 11. The mold block 10 is a heavy unitary copper element having a vertical mold cavity 12 extending completely therethrough. The bottom of the cavity 12 is closed by an underlying copper base member 11. The mold cavity defined by the block 10 and base member 11 has a uniform substantially rectangular horizontal cross section, and a depth greater than the width and less than the length of that cross section. A copper cake 13 (FIG. 2) cast in the cavity 12 has its upper narrow longitudinal side edge defined by the open upper end of the mold and hence exposed to the atmosphere as the metal solidifies.

Traversing means are included in the apparatus for moving the base member 11 horizontally relative to the mold block 10 from the position shown in solid lines in FIG. 2 to that shown in dotted lines. For this purpose, a car 15 provided with wheels 16 and 16' supports the base member 11 horizontally. The wheels 16 and 16' are spaced to roll on a pair of parallel horizontal rails 17 and 17' respectively which are laid on flooring 18 surrounding the entire apparatus or are otherwise suitably supported.

To move the car 15 on the rails, a double-acting hydraulic cylinder 20 is secured to the flooring 18 or other anchoring means between the rails 17 and 17'; and a piston rod 21 secured to a piston in the cylinder is affixed at its outer end to the side of the car. The stroke of the piston in the cylinder 20 is sufficiently great so that the car 15 may be moved along the rails from its position underlying the mold as indicated by the solid lines in FIG. 2 to a position completely clear of the mold block as indicated by the dotted lines in FIG. 2.

Lifting means are associated with the mold block 10 to enable raising the block vertically from the base member 11. To provide structure for attachment of the lifting means, gusset members 22 and 23 are welded to each end of the block 10. The gusset members 22 and 23 extend over two vertically disposed stationary single-acting hydraulic cylinders 24 and 25, and provide surfaces for attachment of piston rods 26 and 27 respectively associated with pistons in the cylinders. The cylinders 24 and 25 extend through corresponding apertures 28 and 29 in the flooring 18, and the lower ends of the cylinders are secured to any suitable foundation.

The piston rods 26 and 27 in the cylinders 24 and 25 each have the same stroke, which is sufficiently great to lift the mold block 10 from its solid line position in contact with the base member 11 as shown in FIG. 1, in the direction of the arrow, to the elevated position shown in dotted lines. To control this vertical movement and prevent tilting of the block 10, guiding means are provided. Such means comprise a pair of racks 31 and 32 affixed to and depending downwardly from the gusset members 22 and 23 respectively through the apertures 28 and 29 in the flooring 18. These racks 31 and 32 are in engagement with identical pinions 33 and 34 respectively which are each affixed to a shaft 36. The outer ends of the shaft 36 are mounted in stationary bearings 38 and 39 affixed to brackets 41 and 42 mounted on framework which supports the flooring 18. Thus, as the mold block 10 is moved vertically, the pinions 33 and 34 insure that each rack moves vertically the same distance and thus they keep the mold block on its proper course, free from tilting.

In order to cool the mold block 10, means are provided to continuously circulate coolant through it. For this purpose a plurality of parallel horizontal cooling fluid passages 45 extend along each side of the cavity through the length of block. These passages open into an inlet manifold cavity 46 defined by an inlet manifold 47 at one end of the mold block 10 and a similar cavity defined by an outlet manifold 48 at the other end. Since the manifolds are identical in structure, only the inlet manifold 47 is broken away in the drawings to show the manifold cavity. Each manifold includes a manifold plate 50 bolted to the upright portion of the gusset member 20 over two vertical parallel slots 51 and 52 formed in the gusset member. Each vertical slot 51 and 52 communicates with the passages 45 on one side of the mold cavity 12. The cavity 46 defined by manifold plate 50 interconnects the two vertical slots 51 and 52 with a tubular conduit fitting 56 extending through the plate 50. By the same construction, another tubular conduit fitting 57 in the outlet manifold 48 communicates with the opposite ends of the plurality of passages 45.

Rigidly affixed to the conduit fittings 56 and 57 are tubular elbow fittings 59 and 60 respectively, to which are attached flexible hoses 62 and 63. The hoses 62 and 63 extend downwardly through holes 64 and 65 in the floor 18 and are connected to a cooling fluid supply conduit 66 and to a return conduit 68 respectively. Cooling fluid is delivered through the supply conduit 66 under pressure from any convenient source and the return conduit 68 returns the fluid to the source after it has passed through the mold block. By this construction the cooling fluid may be continuously circulated through the passages 45 in the mold block 10 even when the block is elevated to the dotted line position shown in FIG. 1.

In the operation of the apparatus described, the mold block 10 and base member 11 are first brought to the positions shown in solid lines in the drawings and water or other cooling fluid is circulated continuously through the passages 45 in the mold block. The bottom of the cavity 12 is closed by the base member 11 in this position. Molten copper or other metal is then poured into the cavity 12 until the cavity is substantially filled. The molten metal in the cavity 12 is rapidly solidified in the cooled mold. Oxidation occurs and other surface defects of the resulting casting are confined to the narrow side edge of the cake exposed to the atmosphere in the open upper end of the cavity.

After solidification of the cake in the mold cavity, the hydraulic cylinders 24 and 25 are actuated to lift the mold block upwardly to the position shown in dotted lines in FIG. 1. The distance through which the mold block is raised is substantially greater than the width of the cake, which is left standing on edge on the base member 11. The hydraulic cylinder 20 is then actuated to draw the car 15 laterally out from under the mold block, about to the position shown in dotted lines in FIG. 2. The cake 13 is thus moved clear of the mold block 10, to a position where it can readily be handled.

The apparatus may be returned to its initial position by actuating the double-acting cylinder 20 to move the base member 11 back to its starting position underlying the mold block 10, and then lowering the block 10 into contact with the base by actuating the cylinders 24 and 25.

The cake 13 is thus removed from the mold without having to lower it or drop it or tilt it on its side, and it can therefore be brought to a position in which it can be readily handled with minimum risk of injury.

I claim:

1. Apparatus for casting rectangular cakes of copper and other metals comprising a vertically movable mold block having a mold cavity extending vertically therethrough, a laterally movable base member adapted to underlie said mold block in contact therewith in a casting position to close the bottom of said cavity, lifting means for raising said mold block vertically from said base member a distance at least as great as the depth of said cavity, and traversing means for moving said base member laterally from its position underlying said block to a position a substantial distance laterally therefrom, whereby a cake cast in said mold cavity may be removed therefrom and transferred to a position for easy handling by raising the mold block from the cake and then moving the base member with said cake thereon laterally to a position where the cake is well clear of the mold block.

2. Apparatus for casting rectangular cakes of copper and other metals comprising a vertically movable mold block having a mold cavity extending vertically therethrough, a laterally movable base member underlying said mold block in contact therewith in a casting position to close the bottom of said cavity, lifting means for raising said mold block vertically from said base member a distance at least as great as the depth of said cavity, and traversing means for moving said base member laterally from its position underlying said block to a position a substantial distance laterally therefrom, said mold block having cooling fluid passages extending therethrough adjacent said cavity, and flexible conduit means connecting a source of pressurized cooling fluid with said passages to permit cooling fluid to be continuously circulated through said block, whereby a cake cast in said mold cavity may be removed therefrom and transferred to a position for easy handling by raising the mold block from the cake and by moving the base member with said cake thereon laterally to a position where the cake is well clear of the mold block.

3. Apparatus for casting rectangular cakes of copper and other metals comprising a vertically movable mold block having a mold cavity extending vertically therethrough, a base laterally movable member underlying said mold block in contact therewith in a casting position to close the bottom of said cavity, and a depth greater than the width and less than the length of said cross section, lifting means for raising said mold block vertically from said base member a distance at least as great as the depth of said cavity, and traversing means for moving said base member laterally from its position underlying said block to a position a substantial distance laterally therefrom, said traversing means comprising horizontally arranged stationary hydraulic cylinder means piston means associated with said cylinder means, and a laterally movable wheeled car supporting said base member and engaged by said piston means, whereby a cake cast in said mold cavity may be removed therefrom and transferred to a position for easy handling by raising the mold block from the cake and by moving the base member with said cake thereon laterally to a position when the cake is well clear of the mold block.

4. Apparatus for casting rectangular cakes of copper and other metals comprising a vertically movable mold block having a mold cavity extending vertically therethrough, a base member adapted to underlie said mold block in contact therewith and close the bottom of said cavity, said cavity having a uniform substantially rectangular horizontal cross section and a depth greater than the width and less than the length of said cross section, and lifting means for raising said mold block vertically from said base member a distance at least as great as the depth of said cavity, guiding means for controlling the vertical movement of said mold block comprising vertical rack means fixed to said mold block and non-translatable rotatable pinion gear means associated with said rack means, whereby a cake cast in said mold cavity may be released therefrom by raising the mold block from the cake.

5. Apparatus for casting rectangular cakes of copper and other metals comprising a vertically movable mold block having a mold cavity extending vertically therethrough, a laterally movable base member underlying said mold block in contact therewith in a casting position to close the bottom of said cavity, and lifting means for raising said mold block vertically from said base member a distance at least as great as the depth of said cavity, said lifting means comprising vertically arranged stationary first hydraulic cylinder means beneath said mold block and first piston means associated with said first cylinder means engaging said mold block, traversing means for moving said base member laterally from its position underlying said block to a position a substantial distance laterally therefrom, said traversing means comprising horizontally arranged stationary second hydraulic cylinder means, second piston means associated with said second cylinder means, and a laterally movable wheeled car supporting said base member and engaged by said second piston means, guiding means for controlling the vertical movement of said mold block comprising vertical rack means fixed to said mold block and non-translatable rotatable pinion gear means associated with said rack means, said mold block having cooling fluid passages extending therethrough adjacent said cavity, and flexible conduit means connecting a source of pressurized cooling fluid with said passages to permit cooling fluid to be continuously circulated through said block, whereby a cake cast in said mold may be removed therefrom and transferred to a position for easy handling by raising the mold block from the cake and by moving the base member with said cake thereon laterally to a position where the cake is well clear of the mold block.

References Cited in the file of this patent

UNITED STATES PATENTS

| | | |
|---|---|---|
| 1,961,399 | Snook | June 5, 1934 |
| 2,085,324 | Lindner | June 29, 1937 |
| 2,106,614 | Lindner | Jan. 25, 1938 |
| 2,234,528 | Jung | Mar. 11, 1941 |
| 2,631,343 | Hunter | Mar. 17, 1953 |
| 2,733,490 | Yates et al. | Feb. 7, 1956 |
| 2,810,170 | Pearce | Oct. 22, 1957 |